(12) United States Patent
Hartlieb

(10) Patent No.: US 7,084,745 B2
(45) Date of Patent: Aug. 1, 2006

(54) SENSOR SYSTEM FOR DETERMINATION OF ENVIRONMENT FOR MOTOR VEHICLES

(75) Inventor: Markus Hartlieb, Waldorfhäslach (DE)

(73) Assignee: DaimlerChrysler AG, Stuttgart (DE)

(*) Notice: Subject to any disclaimer, the term of this patent is extended or adjusted under 35 U.S.C. 154(b) by 93 days.

(21) Appl. No.: 10/476,655

(22) PCT Filed: Mar. 28, 2002

(86) PCT No.: PCT/EP02/03504

§ 371 (c)(1),
(2), (4) Date: May 4, 2004

(87) PCT Pub. No.: WO02/091019

PCT Pub. Date: Nov. 14, 2002

(65) Prior Publication Data

US 2004/0201462 A1  Oct. 14, 2004

(30) Foreign Application Priority Data

May 4, 2001  (DE) .................. 101 21 784

(51) Int. Cl.
*B60Q 1/00* (2006.01)
(52) U.S. Cl. ............. 340/436; 340/904; 340/435; 180/169; 367/94
(58) Field of Classification Search .......... 340/436, 340/904, 902, 425.5, 435, 93, 94; 180/167, 180/169

See application file for complete search history.

(56) References Cited

U.S. PATENT DOCUMENTS

| | | | | |
|---|---|---|---|---|
| 3,226,673 A | * | 12/1965 | Cudworth | 340/904 |
| 4,143,264 A | * | 3/1979 | Gilbert et al. | 250/210 |
| 4,278,962 A | * | 7/1981 | Lin | 340/904 |
| 4,864,298 A | * | 9/1989 | Dombrowski | 340/904 |
| 5,528,217 A | * | 6/1996 | Adams | 340/435 |
| 5,568,137 A | * | 10/1996 | Liu | 340/905 |
| 6,604,592 B1 | * | 8/2003 | Pietsch et al. | 180/168 |
| 6,720,868 B1 | * | 4/2004 | Flick | 340/435 |

FOREIGN PATENT DOCUMENTS

| | | |
|---|---|---|
| JP | 7-280935 | 10/1995 |
| JP | 9-257922 | 10/1997 |
| JP | 11-353599 A | 12/1999 |

OTHER PUBLICATIONS

Translation of a Japanese Office Action dated Sep. 2, 2005.

* cited by examiner

*Primary Examiner*—Daniel Wu
*Assistant Examiner*—Travis Hunnings
(74) *Attorney, Agent, or Firm*—Crowell & Moring LLP

(57) ABSTRACT

The invention relates to a sensor system for sensing objects in an area of the surroundings of a motor vehicle, in which, in order for the sensor system to sense the objects, waves are emitted in a predefinable main irradiation direction, are reflected partially at the objects to be sensed and are then partially received again by the sensor system and evaluated. According to the invention, the main irradiation direction of the emitted waves is predefined by the sensor system in such a way that the emitted waves are firstly reflected at the underlying surface and then reach the spatial area to be monitored.

19 Claims, 1 Drawing Sheet

SENSOR SYSTEM FOR DETERMINATION OF ENVIRONMENT FOR MOTOR VEHICLES

This application claims the priority of German Patent document DE 101 21784.6, filed 4 May 2001 (PCT International Application No. PCT/EP02/03504, filed 28 Mar. 2002, the disclosure of which is expressly incorporated by reference therein.

The invention relates to a sensor system for sensing objects in a area of the surroundings of a motor vehicle.

Sensors for sensing the surroundings of a motor vehicle for different applications have been available for several years and are increasingly being sold as an equipment feature in passenger cars. Thus, for example, ultrasonic sound sensors are used to sense the immediate surroundings of motor vehicles in order to assist the driver during a parking maneuver. In this context, the area in front of and behind the vehicle is monitored by the sensors to a distance of between several centimeters and a few meters. In the case of a system for automatically controlling the distance between vehicles, the vehicles travelling ahead are sensed by means of a radar sensor in the area at a distance between several meters and 100 meters, and the speed of the vehicle is regulated as a function of the sensed vehicles, and in critical cases a warning is additionally issued to the driver.

In the genus-forming German Patent DE 4312595 A1, a motor vehicle is described as having a safety system which has a distance sensor for determining the distance from vehicles travelling ahead. In this context, the sensor senses the objects in the surroundings by virtue of the fact that the main irradiation direction of the sensor system points, as is generally customary, into the spatial area which is to be monitored. If there is an object in the spatial area of the waves which are emitted, some of the waves are reflected by the object, and some of the reflected waves are then received by the sensor system and evaluated.

The main irradiation direction of the emitted waves is to be understood as the direction which results from bisecting the angle of aperture of the main radiation lobe. The emitted waves correspond to irradiated energy, and the radiation lobe is formed by the energy distribution of the irradiated energy, the boundaries of the lobe constituting an area of identical energy density. The emitted waves may be, for example, electromagnetic or acoustic in their nature.

Sensor systems for sensing objects in the surroundings of a vehicle predefine the spatial area or target area to be monitored by emitting their signals into the target area and/or receiving them from the target area. The target area is defined by the radiation lobe with the target area delimited by evaluating signals. In order to permit the sensor system to function it is necessary to ensure that there is a suitable transmission path from the sensor system to the monitored spatial area. This transmission path must be as transmissive and free as possible of disruption for the emitted signals on the way from the sensor to the monitored spatial area and back. This leads to a situation in which the sensors are arranged directly on the outer skin of the vehicle or at least in the vicinity of the outer skin. For example, ultrasonic sensors on vehicles must not be concealed by vehicle paneling or fenders. Radar sensors can only be concealed behind plastic parts which are not too thick because a metal wall such, as the bodywork of the vehicle, reflects the radar waves to a great extent. A plastic layer or a layer of surface coating between the transmitter or receiver and an object to be sensed also causes reflection and absorption of electromagnetic or acoustic waves. This leads to undesired restrictions when installing sensor systems in motor vehicles.

The object of the invention is to reduce the disadvantages which result from the installation of a sensor system for sensing the surroundings in a motor vehicle.

According to the present invention a sensor system is arranged in a vehicle in order to sense objects which are located in a predefinable spatial area around the vehicle. The sensor system transmits waves in a predefinable main irradiation direction which, together with a series of further sensor-specific parameters such as, for example, the transmission power of the sensor system, the angle of aperture of the transceiver, the type of waves and the sensitivity of the sensor system, predefine the monitored spatial area. The emitted waves are partially reflected at an object and then some of the reflected waves are received by the sensor system. By means of signal processing it is possible to determine interesting features of the object from the received waves, said features being, for example, its distance from the sensor or its speed relative to the sensor. According to the invention, the original main propagation direction of the emitted waves, that is, the main irradiation direction of the sensor system, is predefined in such a way that said waves are firstly reflected at the underlying surface and in the process they change their propagation direction and subsequently the spatial area to be monitored. An advantage of the sensor system according to the invention is that the installation of a sensor system is greatly simplified as there is no transmission of signals, that is to say waves do not need to be transmitted, in the direct connecting line between the transmission part of the sensor system and the monitored spatial area. As a result, the surface of the vehicle can be shaped largely independently of the sensor, and the sensor can be mounted in an area of the vehicle which is not in the vicinity of the surface of the vehicle. Examples of applications of a sensor system according to the invention between which it is possible to switch over if necessary are a parking aid system, a system for automatically parking, a hazard detection system, an accident detection system, a triggering system for restrain means or an automatic emergency brake system.

The waves which are emitted by the sensor system are reflected not only at the underlying surface but also at a covering of snow or ice on the underlying surface. There is the possibility here of using additional signal processing to obtain conclusive information about the condition of the underlying surface by means of the received signals, in particular to determine whether the underlying surface is wet or covered with snow or ice.

The distance between the monitored area and the vehicle is decisively influenced by the angle a between the main irradiation direction of the waves and the underlying surface. When the angle $\alpha$ is small, the monitored area is further away from the vehicle than when the angle $\alpha$ is small. In the case of sensing areas which are far away, that is to say when the angles $\alpha$ are large, the advantage of the sensor system according to the invention is reduced, in particular when an angle $\alpha = 0$ the sensor system according to the invention becomes a conventional sensor system. For this reason, the sensor system is advantageous in particular for sensing objects in the vicinity up to a distance of several meters around a vehicle.

Particular difficulties were encountered when accommodating previous sensor systems in a motor vehicle with respect to sensor systems for monitoring the side of the vehicle because a largely metallic surface is present on the side of the vehicle and in addition there is usually little installation space available. As the lateral area of the vehicle to be monitored is at least only several meters from the vehicle, it is possible, as in all applications of the sensor system according to the invention in the close range, to select a large value for the angle α, for which reason advantages of the sensor system according to the invention particularly come into play here.

In one refinement of the sensor system, the angle α is varied as a function of the driving situation or of detected hazardous states in order to adapt the sensed area of the sensor system or to cause the sensed area to follow a detected collision object. In this refinement the distance of the area monitored can be adjusted, in which case objects outside the set sensed area can be sensed.

In a further refinement of the sensor system, the sensor system emits electromagnetic waves, in particular it is a radar system. As large ranges and high sensitivities can be achieved with radar systems, the power loss when there is reflection at the reflective surface which brings about the change in a propagation direction can be satisfactorily compensated.

As an alternative, the sensor system for sensing objects emits ultrasonic sound waves. Ultrasonic sound systems are suitable as sensor systems according to the invention as the reflective power of customary road surfaces is sufficiently good for ultrasonic sound.

Other objects, advantages and novel features of the present invention will become apparent from the following detailed description of the invention when considered in conjunction with the accompanying drawings.

BRIEF DESCRIPTION OF THE DRAWINGS

An advantageous embodiment of the sensor system according to the invention for sensing objects in an area of the surroundings of a motor vehicle will be described in more detail below with reference to the drawing:

The single FIGURE shows a vehicle 1 with a sensor system 2 according to the invention.

DETAILED DESCRIPTION OF THE PREFERRED EMBODIMENT

Figure 1:
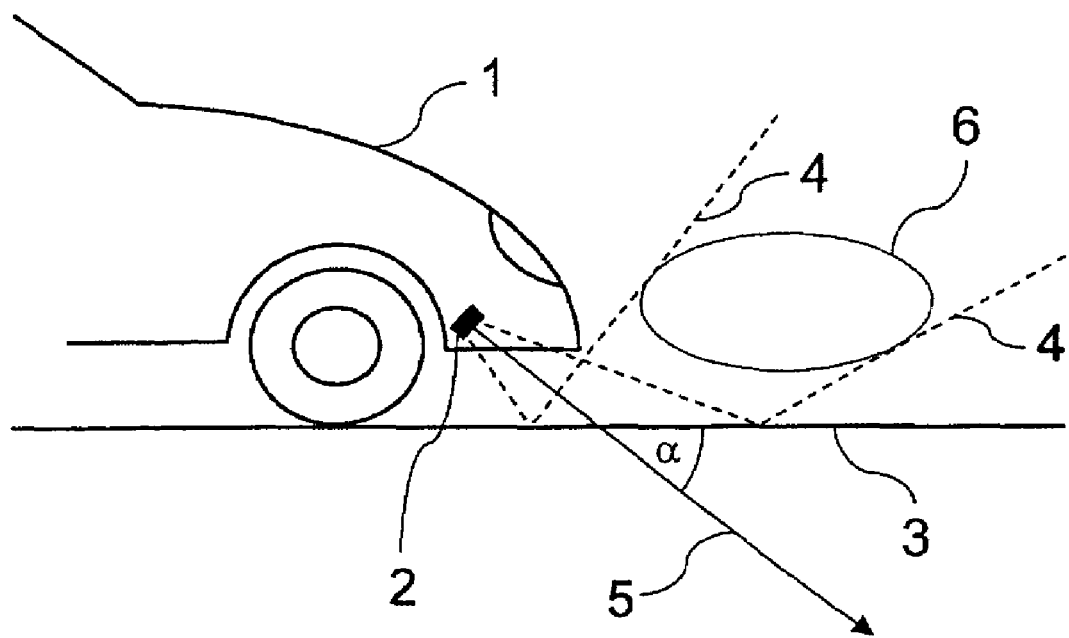

The vehicle is located on an underlying surface 3 which is used according to the invention as a reflective surface. The sensor system 2 is embodied in such a way that the transmitter part and the receiver part are arranged at the same location in the vehicle, both being integrated in the sensor system 2. Furthermore, the angle of aperture of the transmitter part and of the receiver part are of equal magnitude and they both have the same orientation 5. The orientation 5 of the sensor system 2 which corresponds to the main irradiation direction is characterized by the angle α at which this main irradiation direction strikes the underlying surface 3.

In the simple representation, the boundaries 4 of the monitored spatial area are represented by an opening angle, which is approximately valid under certain conditions. Such a condition is for example that in the case of a radar system the far field approximation must be valid. On the other hand, distance from the transmitter must not be too large as the pole diagram extends approximately in the form of a lobe. However, in what follows a beam-shaped boundary 4 of the monitored spatial area will be assumed as the actual shape of the pole diagram does not constitute a basic restriction but rather only has to be taken into account in the practical orientation of the sensor system. The beam-shaped delimitation 4 constitutes a sensitivity threshold, that is to say objects which are located outside the area are also sensed, the sensitivity of the sensor system also greatly decreasing here.

The orientation 5 of the transmitter and receiver parts of the sensor system 2 is selected in such a way that the emitted waves are reflected at the underlying surface 3, the propagation direction of the waves changing. After the change in direction, the boundary 4 of the propagating waves covers the area 6 which is to be monitored. The sensor system 2, in particular its transmitter and receiver part is arranged in the vehicle 1 in such a way that there is no potentially disruptive component of the vehicle 1, for example fender, bodywork, surface coating or radiator grille, located in the propagation path of the emitted waves.

If an object is located in the monitored area 6 or between the beam boundaries 4, some of the incoming waves are reflected at this object and reflected back to the transceiver part of the sensor system 2 after further reflection at the underlying surface 3. The incoming waves are sensed and evaluated by the sensor system 2. The result permits definitive information to be obtained about the surroundings of the vehicle, in particular about the distance and/or speed of objects in the surroundings.

As an alternative to the representation of the sensor system 3 in the FIGURE, the sensor system can also be composed of a spatially separate transmitter part, receiver part and signal processing part, in which case the transmitter and/or the receiver part of the sensor system 1 can be arranged according to the invention. The monitored spatial area 6 is, as is apparent from the representation in the FIGURE, defined inter alia by the angles of aperture, the installation locations and the orientation of the transmitter part and of the receiver part.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A sensor system for sensing objects to be avoided by a motor vehicle in a partial area of the surroundings of said motor vehicle said system comprising:
    means for emitting waves in a predefinable main irradiation direction such that substantially all the waves reflect off a surface underlying the vehicle prior to said waves being at least partially reflected by said objects to be avoided and at least partially received by a receiver means;
    means for evaluating said received waves.

2. The sensor system as claimed in claim 1, further including means for monitoring a vicinity up to several meters around the vehicle.

3. The sensor system as claimed in claim 2, wherein an angle α between the main irradiation direction and the underlying surface is predefined.

4. The sensor system as claimed in claim 2, wherein said means for emitting and said receiving means are parts of a radar system.

5. The sensor system as claimed in claim 2, wherein said emitting means and said receiving means as parts of an ultrasonic sound system.

6. The sensor system as claimed in claim 1, further including means for monitoring a side area of the vehicle.

7. The sensor system as claimed in claim 6, wherein an angle α between the main irradiation direction and the underlying surface is predefined.

8. The sensor system as claimed in claim 6, wherein said means for emitting and said receiving means are parts of a radar system.

9. The sensor system as claimed in claim 6, wherein said emitting means and said receiving means as parts of an ultrasonic sound system.

10. The sensor system as claimed in claim 1, wherein an angle α between the main irradiation direction and the underlying surface is predefined.

11. The sensor system as claimed in claim 10, wherein said means for emitting and said receiving means are parts of a radar system.

12. The sensor system as claimed in claim 10, wherein said emitting means and said receiving means as parts of an ultrasonic sound system.

13. The sensor system as claimed in claim 1, wherein said means for emitting and said receiving means are parts of a radar system.

14. The sensor system as claimed in claim 1, wherein said emitting means and said receiving means are parts of an ultrasonic sound system.

15. The system according to claim 1, wherein a portion of said emitted waves strike the surface directly below said vehicle.

16. A sensor system for monitoring a predetermined area outside a vehicle for objects to be avoided, said system comprising:

a transmitting device outputting signals directly toward a surface on which said vehicle is located wherein substantially all the signals reflect from said surface to detect said objects to be avoided in said predetermined area;

a receiving device for receiving reflected signals from said objects to be avoided in said predetermined area wherein said reflected signals correspond to said transmitted signals wherein said transmitting and receiving device are part of an ultrasonic sound system or a radar system.

17. The system according to claim 16, wherein said transmitted signals contact said surface at a predetermined angle.

18. The system according to claim 16, wherein said transmitting and receiving device are part of a ultrasonic sound system.

19. The system according to claim 16, wherein a portion of said transmitted signals strike the surface directly below said vehicle.

* * * * *